(12) United States Patent
Sawata

(10) Patent No.: US 11,204,341 B2
(45) Date of Patent: Dec. 21, 2021

(54) MEASURING INSTRUMENT

(71) Applicant: Shimadzu Corporation, Kyoto (JP)

(72) Inventor: Hideto Sawata, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 524 days.

(21) Appl. No.: 16/304,188

(22) PCT Filed: Mar. 14, 2017

(86) PCT No.: PCT/JP2017/010095
§ 371 (c)(1),
(2) Date: Nov. 23, 2018

(87) PCT Pub. No.: WO2017/208561
PCT Pub. Date: Dec. 7, 2017

(65) Prior Publication Data
US 2020/0319147 A1    Oct. 8, 2020

(30) Foreign Application Priority Data

May 31, 2016  (JP) .............................. JP2016-108873

(51) Int. Cl.
*G01N 30/64*    (2006.01)
(52) U.S. Cl.
CPC ....... *G01N 30/64* (2013.01); *G01N 2030/645* (2013.01)
(58) Field of Classification Search
None
See application file for complete search history.

(56) References Cited

FOREIGN PATENT DOCUMENTS

| JP | H08-129000 A | 5/1996 |
|---|---|---|
| JP | 2006-112490 A | 4/2006 |

OTHER PUBLICATIONS

International Search Report dated May 30, 2017 in corresponding International Application No. PCT/JP2017/010095; 5 pages.
Written Opinion dated May 30, 2017 in corresponding International Application No. PCT/JP2017/010095; 9 pages.
International Preliminary Report on Patentability dated Dec. 4, 2018 in corresponding International Application No. PCT/JP2017/010095; 6 pages.

*Primary Examiner* — Daniel S Larkin
(74) *Attorney, Agent, or Firm* — Maier & Maier, PLLC

(57) ABSTRACT

A measuring instrument including: a sensor unit outputting an alternating current signal having an amplitude corresponding to a physical amount of a measurement target; a reference signal output unit outputting a reference signal having the same frequency and the same phase as those of the alternating current signal; a multiplication unit multiplying the alternating current signal and the reference signal together; an A/D conversion unit disposed before or after the multiplication unit; and an integration unit integrating a digital signal which is output of the multiplication unit, for a predetermined time. It is possible to measure a value of the physical amount of the measurement target only with a delay of one cycle of the alternating current signal.

3 Claims, 4 Drawing Sheets

(a) ALTERNATING CURRENT SIGNAL (b) COSINE SIGNAL (c) INTEGRATION UNIT OUTPUT (d) MEASURING INSTRUMENT OUTPUT

MEASURING INSTRUMENT

FIELD

The present invention relates to a measuring instrument measuring a physical amount by using an alternating current signal, such as an electrical conductivity detector used in a detector of an ion chromatograph.

BACKGROUND

In an ion chromatograph, an electrical conductivity detector is used in many cases as a detector for detecting each component (ion) of a sample, separated by a column. The electrical conductivity detector applies a voltage between a pair of electrodes disposed by interposing a flow path of an eluate (a sample liquid) from the ion chromatograph, and measures a current flowing between both electrodes, and thus, calculates an electrical conductivity of the eluate flowing between both electrodes, and detects the component separated by the ion chromatograph. Here, in a case where the voltage to be applied between both electrodes is set to a direct current, polarization occurs between the electrodes, and it is not possible to measure an accurate electrical conductivity, and thus, an alternating current (for example, a sine curve) having constant amplitude and frequency is used in the voltage.

A basic circuit of an electrical conductivity detector 10 of the related art is illustrated in FIG. 9. A sensor unit 12 includes a pair of electrodes disposed by interposing a sample liquid, and a sine curve-like alternating current voltage is applied between the electrodes from an alternating current source 11. Accordingly, a current according to an electrical conductivity of the sample liquid existing between both electrodes, flows between both electrodes. An amplifier 13 generates a voltage signal according to the current flowing through the sensor unit 12, but the size (the gain) of an output voltage signal of the amplifier 13 with respect to the size of the current is adjusted by a value of a variable resistor 14 disposed on the amplifier 13. The output signal of the amplifier 13 is multiplied by a reference signal (a sine curve) having the same frequency and phase as those of the alternating current source 11, in a multiplication unit 16. A signal output from the multiplication unit 16, has an offset (a direct current component) in proportion to the electrical conductivity of the sample of the sensor unit 12, and has a waveform in which a frequency is superimposed on a ripple of a cosine curve (an alternating current component) of two times the original signal (the signal of the alternating current source 11 and the reference signal of the reference signal output unit 15). The output signal passes through a lowpass filter (LPF) 17, and the ripple is eliminated, and thus, a signal indicating the electrical conductivity of the sample (a direct current voltage) is obtained.

In a case where the electrical conductivity of the sample liquid flowing through the sensor unit 12 is extremely large, the current flowing between both electrodes extremely increases, and the subsequent circuit such as the multiplication unit 16 does not correspond to such an excessive signal, and thus, the output is saturated. On the contrary, in a case where the electrical conductivity of the sample liquid is extremely small, the output signal is buried in a noise. Therefore, the value of the variable resistor 14 is changed, and thus, the gain of the amplifier 13 is adjusted, and the output of the amplifier 13 falls within a suitable range. Then, a compensation amplifier 18 is disposed after the lowpass filter 17, and the amplification (the attenuation) of the amplifier 13 is returned to the original state. For example, when the gain of the amplifier 13 is set to 1/X times by the variable resistor 14, the gain of the compensation amplifier 18 is set to X times by a variable resistor 19.

Patent Document 1: JP-A-08-129000

SUMMARY

In the detection circuit described above, the lowpass filter 17 sufficiently eliminates the ripple of the alternating current component, and thus, a time constant $\Delta t$ is set to a value which is sufficiently larger (greater than or equal to approximately ten times) than the cycle of the power source 11. The signal generated according to a change in the sensor unit 12 is delayed in the lowpass filter 17, according to the time constant $\Delta t$ of the lowpass filter 17. For this reason, in the case of simultaneously switching the gain of the amplifier 13 (the value of the variable resistor 14) and the gain of the compensation amplifier 18 (the value of the variable resistor 19), for example, as illustrated in FIG. 10, an abnormality (a spike) occurs in the output signal of the lowpass filter 17, according to a temporal difference $\Delta t$. In addition, in a case where a change rate of the electrical conductivity of the sample liquid is large in the first place, in the detection circuit of the related art described above, it is not possible to perform detection sufficiently following the change.

The problems described above are not limited to the electrical conductivity detector, but are general in a measuring instrument continuously measuring a physical amount of a measurement target according to the alternating current signal.

An object of the present invention is to provide a measuring instrument which is capable of following a change in the physical amount of the measurement target, and is capable of correctly corresponding to gain switching or the like.

A measuring instrument according to the present invention which has been made to attain the object described above, the measuring instrument characterized by including:

a) a sensor unit outputting an alternating current signal having an amplitude corresponding to a physical amount of a measurement target;

b) a reference signal output unit outputting a reference signal having the same frequency and the same phase as those of the alternating current signal;

c) a multiplication unit multiplying the alternating current signal and the reference signal together;

d) an A/D conversion unit disposed before or after the multiplication unit; and e) an integration unit integrating a digital signal which is output of the multiplication unit, for a predetermined time.

In the measuring instrument described above, the A/D conversion unit may perform A/D conversion with respect to a signal (a cosine signal) after both analog signals are multiplied together by the multiplication unit, or may perform A/D conversion with respect to each of the alternating current signal and the reference signal output from the sensor unit before the multiplication unit. In the latter case, the multiplication unit also multiplies the digitalized signal. A basic circuit of the former aspect is illustrated in FIG. 1, and a basic circuit of the latter aspect is illustrated in FIG. 2. In both of cases, the same reference numerals are applied to the same elements as those of FIG. 9 which is the basic circuit of the related art. In a measuring instrument 20 of FIG. 1, a cosine signal generated by multiplying an output signal of a sensor unit 12 and the reference signal together, is converted into digital data by an A/D conversion unit 21, and is integrated and output by an integration unit 27 for a predetermined time. In addition, in a measuring instrument 30 of FIG. 2, each of the output signal of the sensor unit 12 and the reference signal is converted into the digital data by A/D conversion units 31 and 32, and then, is multiplied by a multiplication unit 36. Output is obtained by integrating a multiplication result thereof for a predetermined time. In consideration of the calculation, ½ cycle or one cycle of the alternating current signal is desirable as the predetermined time. In a case where a sampling cycle of the A/D conversion unit is sufficiently short, and the data can be sampled to the extent of sufficiently and precisely reproducing the alternating current signal or the cosine signal which is a multiplication result, a time having a predetermined relationship with respect to the cycle of the alternating current signal, may be set, and an integration value of one cycle or ½ cycle may be obtained by the calculation.

In the measuring instruments 20 and 30 of the aspect illustrated in FIG. 1 and FIG. 2, the value of the result of performing the integration for a predetermined time, corresponds to the amplitude of the alternating current signal, and thus, corresponds to the physical amount of the measurement target. Accordingly, it is possible to measure the physical amount of the target only with a delay of one cycle of the alternating current signal. That is, it is possible to follow a change in the physical amount at a much higher speed, compared to the case of using a lowpass filter having a time constant of greater than or equal to ten times the alternating current signal of the related art.

In a case where the width of the change of the physical amount of the measurement target is extremely large, there is a possibility that the width exceeds a convertible range (a dynamic range) of the A/D conversion units 21, 31, and 32. In such a case, the measuring instrument according to the present invention is capable of including an amplifier on the upstream side and a compensation amplifier on the downstream side, as with the related art. That is, a second aspect of the measuring instrument according to the present invention, includes a first amplifier between the sensor unit and the multiplication unit, and a second amplifier having a gain (an inverse gain) of an inverse number of the first amplifier, after the integration unit, in addition to the configuration described above. A state where the amplifiers are added to the measuring instrument 20 of FIG. 1, is illustrated in FIG. 3, and a state where the amplifiers are added to the measuring instrument 30 of FIG. 2, is illustrated in FIG. 4. In the measuring instruments 40 and 50 of FIG. 3 and FIG. 4, both of the second amplifiers 28 and 38 are a digital multiplier.

In the measuring instruments 40 and 50 having such a configuration, in a case where the alternating current signal output from the sensor unit 12 is excessively large, the alternating current signal is attenuated by a first amplifier 13, and is amplified by the attenuated amount, by a second amplifiers 28 and 38 to return to the original state, and thus, it is possible to prevent the signal from being saturated in the A/D conversion units 21, 31, and 32 or the multiplication units 16 and 36, and to perform accurate measurement. At this time, the lowpass filter is not used in the measuring instruments 40 and 50, and thus, it is possible to prevent the abnormality of the output signal due to a temporal difference in the signal according to a time constant. Furthermore, on the contrary, in a case where the alternating current signal output from the sensor unit 12 is excessively small, and a sufficient intensity is not capable of being ensured with respect to a noise (a case where a sufficient S/N ratio is not capable of being obtained), the alternating current signal is amplified in the first amplifier 13, and is attenuated by the amplified amount, by the second amplifiers 28 and 38 to return to the origin.

In a case where the gain/the inverse gain of the first amplifier 13 and the second amplifiers 28 and 38 are simultaneously changed, at a time point when the amplitude of the alternating current signal exceeds a predetermined threshold value set by considering the convertible range (or at a time point when the amplitude of the alternating current signal is lower than a predetermined threshold value set by considering the sufficient S/N ratio), strictly, in many cases, such a gain change occurs in the middle of the integration of one cycle of the integration units 27 and 37. In this case, the gain change of the first amplifier 13 occurs in the middle of the data of one cycle, and data before the amplification (actually, the attenuation) and data after the amplification (the attenuation) are mixed in integration data of one cycle, whereas the second amplifiers 28 and 38 amplify a value after the integration of one cycle, with the inverse gain, and thus, there is a possibility that the data of the cycle is not accurate, and a spike occurs.

In such a case, in order to compensate the spike, the measuring instrument according to the present invention may include a memory unit sequentially storing the digital data which is the output of the multiplication unit, at least for a time of one cycle of the alternating current signal, in addition to the configuration described above. A circuit of a measuring instrument 60 in which such a memory unit 62 is added to the measuring instrument 40 of FIG. 3, is illustrated in FIG. 5. In the measuring instrument 60, the memory unit 62 constantly retains the output of the second amplifier 48 (an integration result of one cycle of the cosine signal) for each cycle. The output of the second amplifier 48 is generally the output of the measuring instrument 60 as it is, but when the gains of the first amplifier 13 and the second amplifier 48 are simultaneously switched, the output of the cycle is extracted from the memory unit 62. Accordingly, it is possible to prevent the occurrence of the spike.

The measuring instrument according to the present invention is capable of measuring the physical amount of the target only with the delay of one cycle of the alternating current signal. That is, it is possible to follow a change in the physical amount at a much higher speed, compared to the case of using the lowpass filter having a time constant of greater than or equal to ten times the alternating current signal of the related art. In addition, even in a case where an amplifier or a compensation amplifier for gain switching is provided corresponding to the physical amount of which the width of a change is extremely large, it is possible to perform accurate output swiftly corresponding to the gain switching.

DETAILED DESCRIPTION

An embodiment of a measuring instrument according to the present invention will be described with reference to the drawings. In the following embodiment, an electrical conductivity detector used in an ion chromatograph, will be described as an example.

Figure 1:
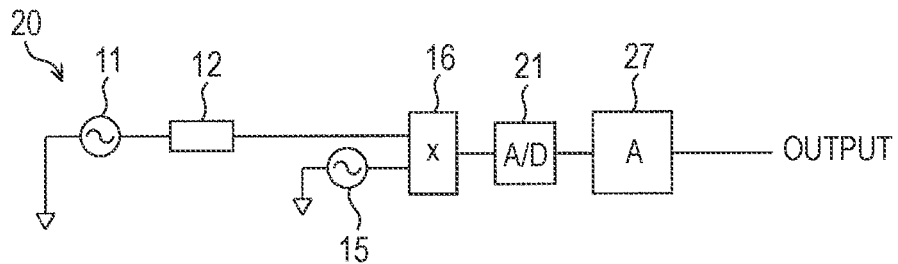
FIG. 1 is a basic circuit diagram in which an A/D conversion unit is disposed after a multiplication unit, in a measuring instrument according to a first aspect of the present invention.
Figure 2:
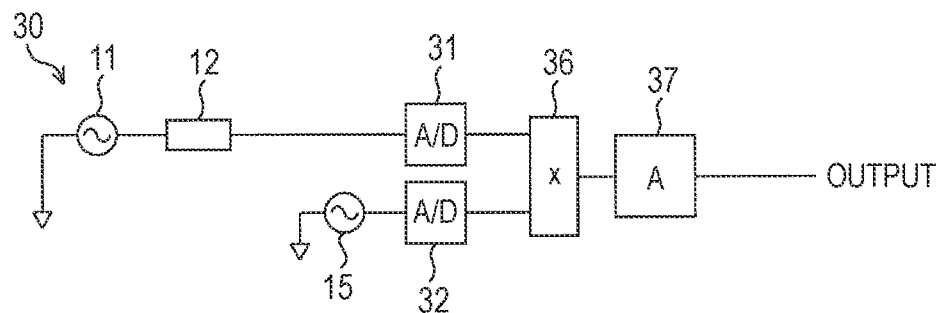
FIG. 2 is a basic circuit diagram in which the A/D conversion unit is disposed before the multiplication unit, in the measuring instrument according to the first aspect of the present invention.
Figure 3:
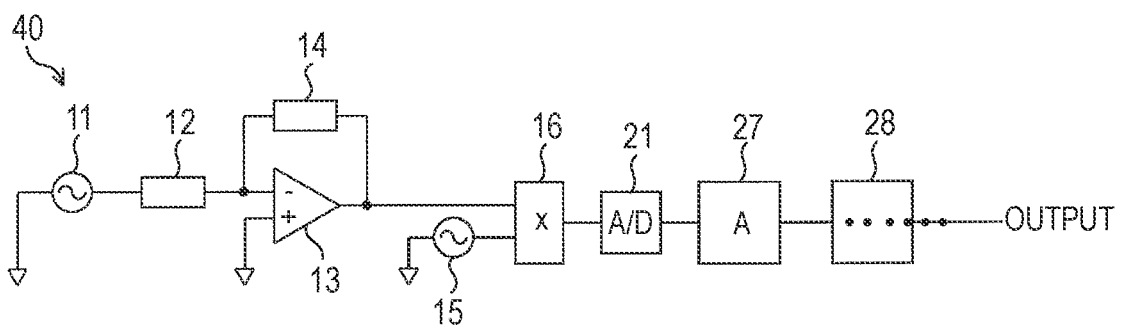
FIG. 3 is a basic circuit diagram in which an A/D conversion unit is disposed after a multiplication unit, in a measuring instrument according to a second aspect of the present invention.
Figure 4:
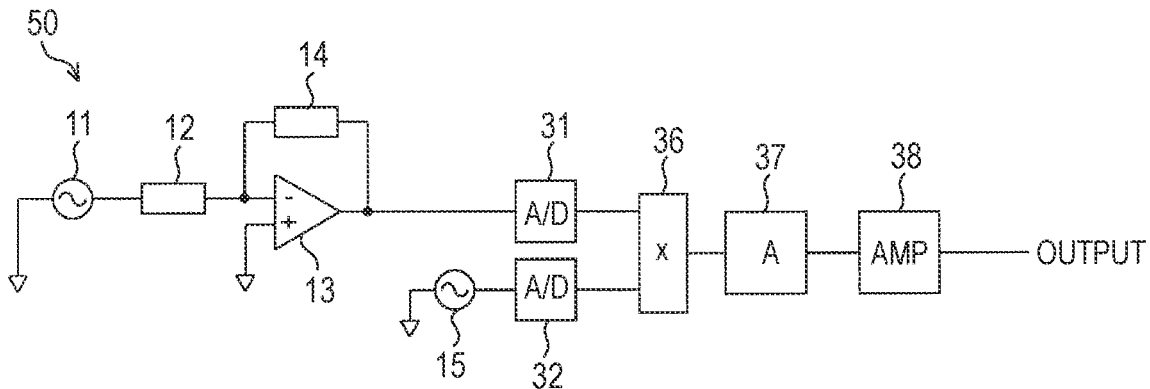
FIG. 4 is a basic circuit diagram in which the A/D conversion unit is disposed before the multiplication unit, in the measuring instrument according to the second aspect of the present invention.
Figure 5:
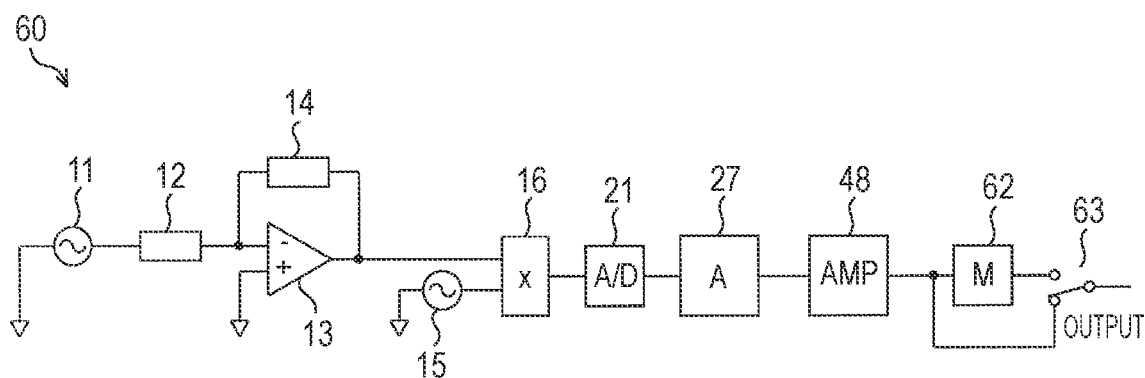
FIG. 5 is a basic circuit diagram in which a memory unit is provided in the measuring instrument according to the second aspect of the present invention.
Figure 6:
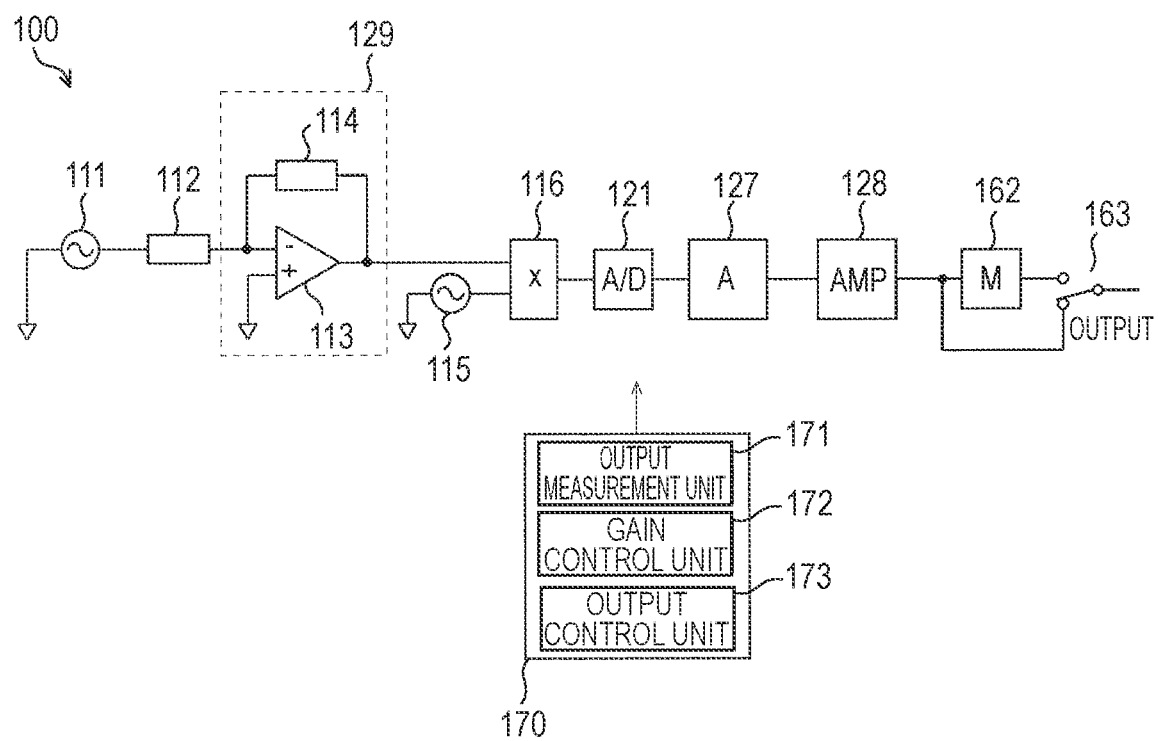
FIG. 6 is a diagram illustrating a configuration of an electrical conductivity detector according to one embodiment of the present invention.

FIG. 6 is a diagram illustrating a configuration of an electrical conductivity detector according to one embodiment of the present invention. An electrical conductivity detector 100 includes an alternating current source 111, a sensor unit 112, a first amplification unit 129, a reference signal output unit 115, a multiplication unit 116, an A/D conversion unit 121, an integration unit 127, a second amplification unit 128, a memory unit 162, an output selection unit 163, and a control unit 170 controlling each unit.

A voltage source outputting a sine curve-like alternating current voltage having predetermined amplitude and frequency, is used in the alternating current source 111. The sensor unit 112 includes a pair of electrodes disposed by interposing a flow path of an eluate from an ion chromatograph, and the alternating current source 111 and the first amplification unit 129 are connected to the pair of electrodes.

The first amplification unit 129 is an inverting amplification circuit including an amplifier 113 and a variable resistor 114, and the sensor unit 112 is connected to an inverting input terminal of the amplifier 113. The first amplification unit 129 outputs a current from the sensor unit 112, as a voltage signal which is amplified with a gain determined by the variable resistor 114. The value of the variable resistor 114 is set according to a signal from a gain control unit 172 described below.

The multiplication unit 116 is a circuit which is connected to each of the first amplification unit 129 and the reference signal output unit 115, and multiplies and outputs a signal input therefrom, and includes an analog multiplication circuit.

The A/D conversion unit 121 is an analog-digital converter converting an analog signal input from the multiplication unit 116 into digital data by sampling the analog signal at a predetermined sampling cycle. The sampling cycle is set to be sufficiently short with respect to an output frequency of the alternating current source 111. The A/D conversion unit 121 includes a convertible range (a dynamic range) of the signal to be input, and an upper limit threshold value slightly lower than the maximum value of the range and a lower limit threshold value slightly higher than the minimum value of the range are respectively stored in the control unit 170.

The integration unit 127 repeats processing of integrating the digital data input from the A/D conversion unit 121 for a time of ½ cycle of the frequency of the alternating current source 111 to be output.

The second amplification unit 128 is a digital multiplier multiplying the digital data input from the integration unit 127 by a predetermined gain to be output. The gain of the second amplification unit 128 is set according to the signal from the gain control unit 172 described below.

The memory unit 162 stores the signal input from the second amplification unit 128 for a predetermined time, and outputs the retained signal according to an instruction of the control unit 170 described below. The output selection unit 163 connects any one of an output end of the memory unit 162 and an output end of the second amplification unit 128 not through the memory unit 162, to an output end of the electrical conductivity detector 100.

The control unit 170 includes an output measurement unit 171, the gain control unit 172, and an output control unit 173. The control unit 170 is connected to the first amplification unit 129 and the second amplification unit 128, the memory unit 162, and the output selection unit 163 (not illustrated), and controls each of the units to which the control unit 170 is connected.

The output measurement unit 171 monitors a signal on the output end of the integration unit 127, and transmits a measurement value thereof to the gain control unit 172. The measurement value is a direct current component in proportion to an amplitude of an alternating current signal to be output from the first amplification unit 129. In the gain control unit 172, threshold values of the direct current component corresponding to the upper limit threshold value and the lower limit threshold value of the A/D conversion unit 121 (a direct current upper limit value and a direct current lower limit value) are stored, and in a case where the measurement value exceeds the direct current upper limit value or is lower than the direct current lower limit value, a control signal for a gain change is transmitted to the first amplification unit 129, and thus, the subsequent measurement value is adjusted to be in a range between the direct current upper limit value and the direct current lower limit value. In addition, the gain control unit 172 changes the gain of the second amplification unit 128, along with a gain change of the first amplification unit 129. In the gain of the second amplification unit 128, an inverse number of the gain of the first amplification unit 129 is set. The gain control unit 172 notifies the output control unit 173 that the gain is switched.

The output control unit 173 controls the output selection unit 163. The output control unit 173 controls the output selection unit 163 such that the output end of the electrical conductivity detector 100 is connected to the output end of the second amplification unit 128 not through the memory unit 162, before receiving the notification that the gain is switched. Then, in a case where the notification is received, the output control unit 173 transmits a switching signal to the output selection unit 163. The output selection unit 163 receives the switching signal, and switches a connection destination of the output end of the electrical conductivity detector 100 to the output end of the memory unit 162 from the output end of the second amplification unit 128. The output control unit 173 transmits the switching signal to the output selection unit 163 after the time of ½ cycle of the alternating current signal from the alternating current source 111 from the reception of the notification. The output selection unit 163 receives the switching signal, and switches the connection destination of the output end of the electrical conductivity detector 100 to the output end of the second amplification unit 128 from the output end of the memory unit 162 (not through the memory unit 162).

Next, the operation of the electrical conductivity detector according to this embodiment will be described. First, an operation in a case where the alternating current signal is changed within the dynamic range of the A/D converter 121, will be described.

In a case where the alternating current voltage is applied to the sensor unit 112 from the alternating current source 111, an alternating current having an amplitude according to an electrical conductivity of the eluate, flows between the electrodes of the sensor unit 112. The alternating current is input into the first amplification unit 129, and thus, becomes the alternating current signal amplified according to a gain X set in the first amplification unit 129 (the first cycle of FIG. 7(*a*)).

Figure 7:
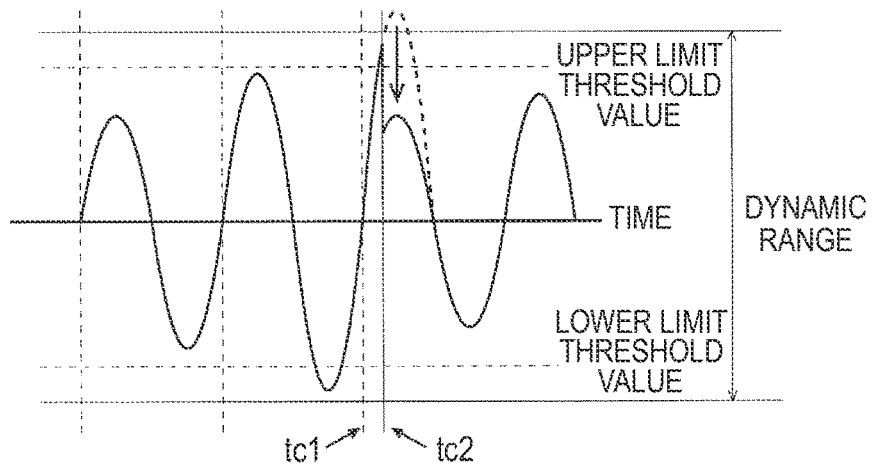
FIG. 7 is a diagram illustrating a waveform of an output signal of each unit of the embodiment.
Figure 7:
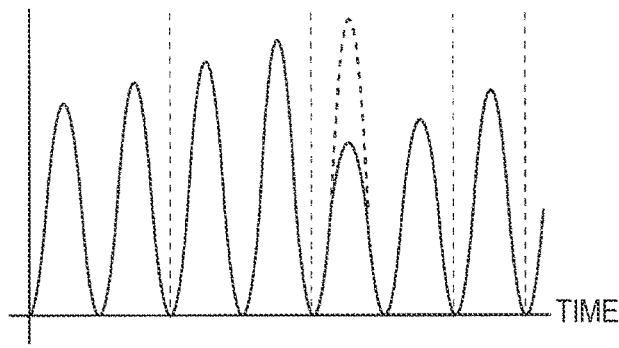
Figure 7:
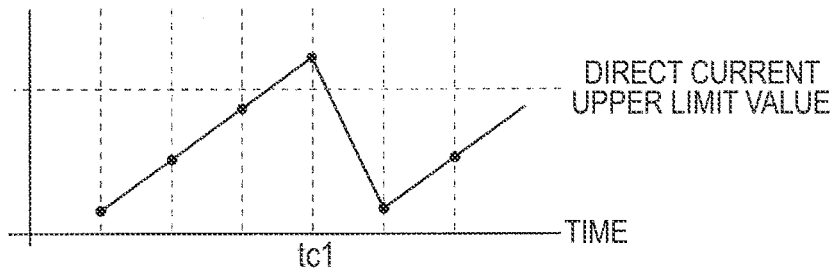
Figure 7:
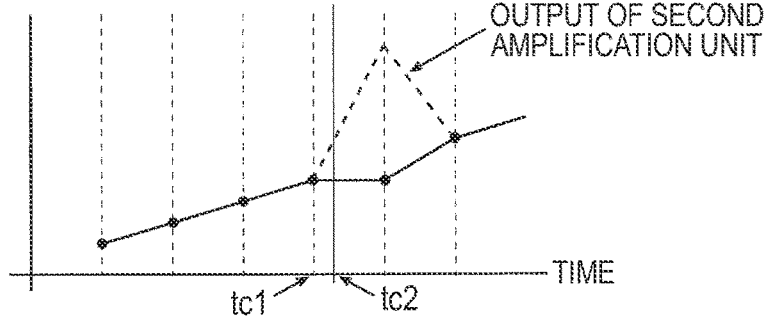

In a case where the alternating current signal is input into the multiplication unit 116, the alternating current signal is multiplied by a reference signal, and as illustrated in FIG. 7(*b*), a cosine signal having an offset in proportion to the electrical conductivity of the eluate (the direct current component) is obtained, on which a ripple of a cosine curve having a frequency two times the alternating current signal, is superimposed. Then, the cosine signal is converted into the digital data by the A/D conversion unit 121.

The integration unit 127 performs integration with respect to the digital data transmitted from the A/D conversion unit 121, for each ½ cycle of the alternating current signal, that is, for each cycle of the cosine signal, and outputs an integration value thereof. Accordingly, the digital data corresponding to the direct current component from which the ripple of the cosine signal is eliminated, is output for each cycle of the integration (FIG. 7(*c*)).

The second amplification unit 128 multiplies the integrated digital data by an inverse number 1/X of the gain of the first amplification unit 129, and thus, allows the digital data to return to a value before being amplified with the gain X of the first amplification unit 129 (FIG. 7(*d*)).

The digital data output from the second amplification unit 128, is stored in the memory unit 162, but it is set that the output end of the electrical conductivity detector 100 is connected to the second amplification unit 128 not through the memory unit 162, except when the gain switching is performed, and thus, the output of the second amplification unit 128 becomes the output of the electrical conductivity detector 100 as it is.

Next, a switching operation of the gain of the first amplification unit 129 and the second amplification unit 128 in a case where the alternating current signal exceeds the upper limit threshold value of the A/D converter 121, will be described.

The gain control unit 172 changes the gain of the first amplification unit 129 and the second amplification unit 128 in a case where the output of the second amplification unit 128, measured by the output measurement unit 171, exceeds a predetermined direct current upper limit value. In an output waveform of the second amplification unit 128 in FIG. 7(*c*), an output value at a time tc1 exceeds the direct current upper limit value. The gain control unit 172 transmits a signal of setting the gain of the first amplification unit 129 to be ½ times the current gain X at the time tc1, and transmits a signal of setting the gain of the second amplification unit 128 to be two times the current gain 1/X. In a case where the gain of both of the amplification units is switched at a time tc2, the amplitude of the alternating current signal to be output from the first amplification unit 129 after the time tc2, decreases, and the signal to be input into the A/D conversion unit 121, is within the dynamic range of the A/D conversion unit 121 (FIG. 7(*a*)). Furthermore, a magnification ratio of changing the gain may be a magnification ratio other than two times, or may be suitably set according to the dynamic range or a change rate of the direct current signal to be expected.

In a case where the gain described above is switched in the middle of the integration of the integration unit 127, a value in which data before the gain switching and data after the gain switching are mixed in one integration data item, is output from the integration unit 127. The digital data is multiplied by the gain after the gain switching, and thus, a spike illustrated by a broken line of FIG. 7(*d*), occurs on the data output from the second amplification unit 128.

In a case where the notification of the gain switching is received from the gain control unit 172, the output control unit 173 transmits the switching signal to the output selection unit 163. The output selection unit 163 receives the switching signal, switches the connection destination of the output end of the electrical conductivity detector 100 to the output end of the memory unit 162, and sets the output of the memory unit 162 to the output of the electrical conductivity detector 100. Then, when the next digital data is output, the output control unit 173 transmits the switching signal to the output control unit 163, and the output selection unit 163 receives the switching signal, and switches the connection destination of the output end of the electrical conductivity detector 100 to the output end of the second amplification unit 128. As described above, a spike occurs in the output of the second amplification unit 128 immediately after the gain switching, but it is possible to prevent the spike from being output by switching the output selection unit 163, and to obtain the output without a spike, as illustrated by a solid line of FIG. 7 (*d*).

Even in a case where the electrical conductivity decreases over time, and is lower than the lower limit value, the gain of the first amplification unit 129 is set to two times the current gain X, the gain of the second amplification unit 128 is set to ½ times the current gain 1/X, and the other processing is performed as with the embodiment described above, and thus, the gain switching can be performed.

Furthermore, the embodiment described above is an example, and it is obvious that suitable modification or correction can be performed according to the scope of the present invention. For example, in the embodiment described above, the integration time of the integration unit is set to the time of ½ cycle of the alternating current signal, but may be longer than the time of ½ cycle of the alternating current signal. In this case, the integration time is set to an integer multiple of ½ cycle of the alternating current signal, and thus, the alternating current component of the signal can be eliminated. In addition, a time for the output selection unit to connect the output of the memory unit to the output end of the measuring instrument is set to ½ cycle of the alternating current signal, but may be longer than ½ cycle of the alternating current signal.

Figure 8:
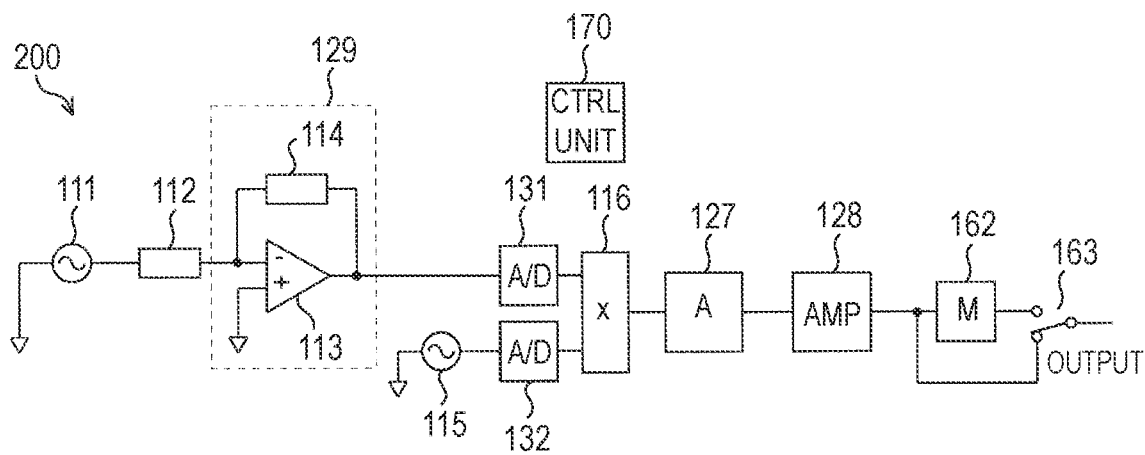
FIG. 8 is a diagram illustrating a configuration of an electrical conductivity detector according to a modification example of the embodiment of the present invention.
Figure 9:
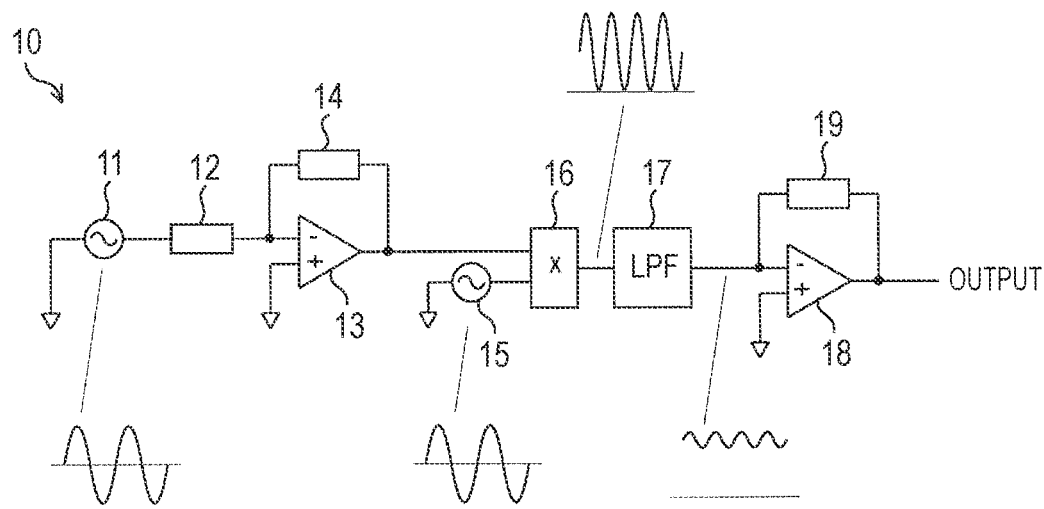
FIG. 9 is a basic circuit diagram of an alternating current signal measuring instrument of the related art.
Figure 10:
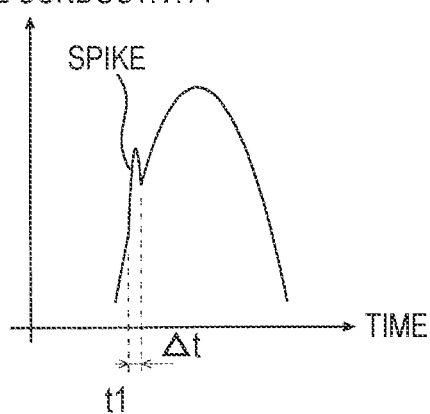
FIG. 10 is an example of a spike which occurs at the time of gain switching, in the basic circuit diagram of the alternating current signal measuring instrument of the related art.

In addition, the A/D conversion unit may be disposed before the multiplication unit (FIG. 8). In this modification example, the A/D conversion units 131 and 132 disposed before the multiplication unit 116, respectively convert the alternating current signal from the first amplification unit 129 and the reference signal from the reference signal output unit 115 into the digital data, and the multiplication unit 116 multiplies the digital data. The other configurations are identical to those of the embodiment described above.

The invention claimed is:

1. An electrical conductivity detector of an ion chromatograph, the detector comprising:
   a sensor unit outputting an alternating current signal having an amplitude corresponding to an electrical conductivity of an eluate from the ion chromatograph;
   a reference signal output unit outputting a reference signal having the same frequency and the same phase as those of the alternating current signal;
   a multiplication unit multiplying the alternating current signal and the reference signal together;
   an A/D conversion unit disposed before or after the multiplication unit;
   an integration unit integrating a digital signal which is output of the multiplication unit, for a predetermined time;
   a first amplifier disposed between the sensor unit and the multiplication unit;
   a second amplifier which is disposed after the integration unit, and has a gain of an inverse number of the first amplifier;
   a gain control unit simultaneously changing a gain of the first amplifier and a gain of the second amplifier;
   a memory unit sequentially storing the digital signal which is the output of the multiplication unit, at least for a time of ½ cycle of the alternating current signal;
   an output selection unit selecting any one of an output end of the memory unit and an output end of the second amplifier not through the memory unit; and
   an output control unit allowing the output selection unit to select the output end of the memory during a predetermined period after the gain of the first amplifier and the gain of the second amplifier are changed by the gain control unit, and allows the output selection unit to select the output end of the second amplifier during a period other than the predetermined period.

2. The electrical conductivity detector according to claim 1,
   wherein the output control unit allows the output selection unit to select the output end of the memory when the gain of the first amplifier and the gain of the second amplifier are changed by the gain control unit, and allows the output selection unit to select the output end of the second amplifier after the time of ½ cycle of the alternating current signal.

3. The electrical conductivity detector according to claim 1,
   wherein a spike is included in a digital signal of the second amplifier when the gain of the first amplifier and the gain of the second amplifier are changed by the gain control unit, and the output control unit allows the output selection unit to select the output end of the memory, and thus, outputs a digital signal not including a spike, which is stored in the memory.

* * * * *